United States Patent [19]

Marzola et al.

[11] Patent Number: 5,256,226
[45] Date of Patent: Oct. 26, 1993

[54] PROCESS FOR REPAIRING EXPOSED OR DAMAGED PARTS OF A PLASTIC COATINGS ON METAL TUBING BY COATING OR PATCHING THE AREA WITH AN ADHESIVE POLYMER COMPOSITION

[75] Inventors: Roberto Marzola; Gian L. Rigosi, both of Ferrara, Italy

[73] Assignee: Himont Incorporated, Wilmington, Del.

[21] Appl. No.: 646,569

[22] Filed: Jan. 28, 1991

[30] Foreign Application Priority Data

Feb. 6, 1990 [IT] Italy .................. 19271A/90

[51] Int. Cl.$^5$ .......................... B29C 73/10; C09J 5/00
[52] U.S. Cl. .................... 156/95; 427/142; 427/207.1; 156/334
[58] Field of Search ............. 427/142, 207.1, 208.8, 427/318; 156/94, 95, 98, 334

[56] References Cited

U.S. PATENT DOCUMENTS

| | | | |
|---|---|---|---|
| 2,838,437 | 6/1958 | Busse et al. | 156/334 |
| 2,924,546 | 2/1960 | Shaw | 156/98 |
| 3,224,900 | 12/1965 | Creamer et al. | 427/318 |
| 3,359,154 | 12/1967 | Clark | 156/334 |
| 3,468,753 | 9/1969 | Vincent et al. | 156/334 |
| 3,483,276 | 12/1969 | Mahlman et al. | 260/897 |
| 3,826,704 | 7/1974 | Ohya et al. | 427/318 |
| 4,058,647 | 11/1977 | Inoue et al. | 156/334 |
| 4,062,997 | 12/1977 | Hotta et al. | 427/318 |
| 4,182,782 | 1/1980 | Scheiber | 427/318 |
| 4,198,327 | 4/1980 | Matsumoto et al. | 260/4 |
| 4,232,086 | 11/1980 | Mori et al. | 156/334 |
| 4,350,797 | 9/1982 | Marzola et al. | 156/321 |
| 4,407,893 | 10/1983 | Malizio | 427/318 |
| 4,421,569 | 12/1983 | Dichter et al. | 427/318 |
| 4,529,772 | 7/1985 | Druschke et al. | 427/207.1 |
| 4,670,301 | 6/1987 | Jaremco et al. | 427/318 |
| 4,725,454 | 2/1988 | Galli et al. | 427/208.8 |
| 4,892,605 | 1/1990 | Shneider et al. | 156/335 |
| 4,906,497 | 3/1990 | Hellmann et al. | 427/207.1 |
| 5,021,113 | 6/1991 | Sanders et al. | 156/334 |
| 5,037,700 | 8/1991 | Davis | 427/207.1 |

FOREIGN PATENT DOCUMENTS

| | | |
|---|---|---|
| 0049609 | 4/1982 | European Pat. Off. . |
| 0134491 | 3/1985 | European Pat. Off. . |
| 0163508 | 12/1985 | European Pat. Off. . |
| 0370786 | 5/1990 | European Pat. Off. . |
| 63-199885 | 8/1988 | Japan .................. 427/142 |

Primary Examiner—Shrive Beck
Assistant Examiner—Diana Dudash

[57] ABSTRACT

Disclosed is a process for repairing removed or damaged parts of plastic coating on metal tubing characterized in that the coating material or the adhesive for patches or bands is an adhesive polymer composition comprising by weight:

A) from 59% to 94% of polypropylene, propylene/ethylene random copolymer, propylene/ethylene/1-butene random copolymer or mixtures thereof with one or more plastomeric polymers selected from the group consisting of ethylene/vinyl acetate copolymers, LDPE, HDPE, polyamides and polyurethane;

B) from 5% to 40% of a polymer or a mixture of elastomeric polymers selected from the group consisting of EPR, EPDM, SEBS block copolymers, SBS block copolymers and ethylene/ethyl acrylate copolymers;

C) from 1% to 10% of polypropylene modified with from 1 to 10% of maleic anhydride, isophorone bismaleamic acid or acrylic acid; and D) from 0% to 3% of carbon black.

9 Claims, No Drawings

PROCESS FOR REPAIRING EXPOSED OR DAMAGED PARTS OF A PLASTIC COATINGS ON METAL TUBING BY COATING OR PATCHING THE AREA WITH AN ADHESIVE POLYMER COMPOSITION

The present invention concerns a process for repairing plastic coatings on metal tubing.

Metal tubing, usually made of steel, coated with plastic materials is widely employed in the manufacture of pipes used for transporting at great distances fluids such as oil, natural gas or water.

Said pipes must be able to withstand the most varied environmental conditions and, in some cases, the high temperatures which are maintained, for example, in the proximity of pumping stations, or which may be typical of certain liquids extracted from the earth.

Therefore, so as not to create weak points along the pipe line, it is necessary that the damaged or removed parts of the plastic coating, such as those at the welding points of the pipes, be repaired in such a way as to obtain mechanical properties as homogeneous as possible with the original coating.

Various materials and methods for repairing polyethylene coatings are known in the art. Typically used are bands and filling materials based on polyethylene and mastics based on polyolefins and elastomeric polymers.

With the above mentioned materials and with the methods presently known for their application, one can obtain good mechanical properties in the repaired parts. Said properties, however, are considerably inferior to those of the original coating, especially regarding the levels of peel resistance, cathodic disbonding and impact.

Moreover, the materials and methods of the prior art prove to be inadequate for repairs of polypropylene coatings which, by virtue of their superior physical-mechanical characteristics, find more and more applications in the field of coated steel tubing.

The Applicants have now found materials and methods for repairing removed or damaged parts of plastic coating, which materials have high physical-mechanical characteristics that are comparable to those of the original coating and that prove to be particularly adequate for repairing coatings made of polypropylene materials.

One process in particular has been found for the repair of removed or damaged parts of the coating of metal tubing which has been coated with plastic materials, characterized in that as coating material or adhesive for patches or bands is used an adhesive polymer composition comprising by weight:

A) from 59% to 94% of polypropylene, propylene-/ethylene random copolymer, propylene/ethylene/1-butene random copolymer or mixtures thereof with one or more plastomeric polymers selected from the group consisting of ethylene/vinyl acetate copolymers, LDPE, HDPE, polyamides and polyurethane;

B) from 5% to 40% of a polymer or a mixture of elastomeric polymers selected from the group consisting of EPR, EPDM, SEBS block copolymers, SBS block copolymers and ethylene/ethyl acrylate copolymers;

C) from 1% to 10% of polypropylene modified with from 1 to 10% of maleic anhydride, isophorone bismaleamic acid or acrylic acid; and D) from 0% to 3% of carbon black.

Examples of preferred polymer materials for component A) are:

isotactic polypropylene having an isotactic index up to 99%;

propylene/ethylene random copolymers having an ethylene content from 1% to 6% by weight, preferably from 24 to 4%;

propylene/ethylene/1-butene random copolymers having an ethylene content of from 24 to 3% and a 1-butene content of from 4.5% to 5.6% by weight.

Specific examples of plastomeric polymers which can be used in a mixture with the polypropylene and the random copolymers used for the component A) are ethylene/vinyl acetate copolymers having a vinyl acetate content of from 10% to 55% by weight, Ternil B27 polyamide produced by Enimont and Pellethane E 2355-65D polyurethane produced by Dow Chemical.

Examples of block copolymers suitably used for component B) are Kraton G 1652 and Kraton FG 1901X SEBS copolymers and Kraton D 1101 and Kraton D 1102 SBS copolymers commercially available from Shell Chemical Co.

The modified polypropylene which constitutes component C) is a polymer with variable grades of crystallinity and can be prepared according to various known methods, mixing, either in the solid state or in solution, the polypropylene and maleic anhydride, isophorone bismaleamic acid, or acrylic acid, preferably in the presence of a free radical initiator, like an organic peroxide.

Examples of the above mentioned preparation methods are described in U.S. Pat. Nos. 4,350,797 and 4,578,428.

According to the process of the present invention, a number of repair techniques can be used mainly based on the extent of the area of the removed or damaged coating.

When the extent of the above mentioned surface is relatively small (indicatively less than about 70 cm$^2$) it is preferable to apply the adhesive composition as such in the melted state, or to use, as coating materials, one or more olefin polymer patches which are affixed to the exposed surface of the pipe with one or more layers of the above mentioned adhesive polymer composition.

Examples of polyolefins which can be used for the patches are:

isotactic polypropylene having an isotactic index up to 99%, optionally in a mixture with 5% to 40% by weight of an EPR or EPDM rubber;

heterophasic compositions obtained by sequential stereospecific polymerization of propylene with ethylene or other alpha-olefins, containing up to 40% by weight of ethylene;

other materials suitable for use are the thermoplastic rubbers obtained by the dynamic vulcanization of mixtures of a plastomeric olefin polymer and an unsaturated olefin copolymer rubber. Examples of the above mentioned materials and their preparation methods are described in published European patent applications 46,285 and 213,285.

The patches may also contain, as a stabilizer against U.V. radiation, up to 3%, e.g. from 24 to 3% by weight of carbon black.

One can also use patches comprising an adhesive layer, obtained, for example, by coextruding the coating material and the adhesive polymer composition.

According to all the techniques described above, it is preferable to heat the area to be repaired before applying the adhesive and the coating material. For this purpose any heat source which does not cause thermal degradation of the polymer surrounding the area to be repaired can be used. For example, radiating panels, electric resistors, induction furnaces or infrared lamps can be used.

Typically, during the above mentioned heating phase the exposed metal is heated to about 150°–250° C., preferably 180°–230° C.

Where the repair is done using only the adhesive polymer composition in the melted state, the polymer composition can be poured from an extruder and worked, with a spatula for instance, to make even the thickness and remove any underlying air bubbles.

If the repair is done using patches, they can be heated to the melting point and pressed against the surface of the pipe in order to make even the thickness and remove any underlying air bubbles. For this purpose one can use the heat sources described above. It is advisable to submit the under layer of adhesive to the said heating and pressing treatment if it is previously deposited on the surface to be recoated. Said adhesive can be deposited by extrusion, as film, or as powder.

Optionally, before the application of the materials described above, the exposed surface of the pipe can be submitted to pretreatments, such as cleaning by brushing or sanding, and an application of one or more primers, such as epoxy resins, silanes and chromates.

When the size of the damaged part is considerable, such as when the coating has been removed in order to weld the pipes, it is preferable to use, for the repairs, some bands made of olefin polymers which are affixed to the exposed surface of the pipe with one or more layers of adhesive. The bands can also be layered one on top of the other or used over patches described above as an additonal coating. The polyolefins preferably used for the bands are the same ones described earlier for the patches. In this case too one can use bands comprising an adhesive layer, obtained, for example, by coextruding the coating material and the adhesive polymer composition.

Typically, the prefered techniques for the application of bands comprise the following operations:
1) brushing and/or sanding and drying of the exposed surface of the pipe;
2) optional bevel cut of the edge of the plastic coating surrounding the exposed surface;
3) optional application of primers only on the exposed metal surface;
4) coating of the exposed surface with a band comprising a layer of adhesive, or with two separate bands, a coating and an adhesive one, (as an alternative one can use powder adhesive) wide enough to overlap the coating of the pipe for a few millimeters; said bands are for instance affixed by heat sealing; the coating band is long enough to be able to provide one or more layers in order to be able to obtain the desired coating thickness;
5) heating the band (or bands).

The band heating operation can be done in a reduced pressure environment in order to remove any possible underlying bubbles. It is also possible to use a controlled pressure on the band, in order to eliminate possible air bubbles, by using, for instance, an air tube, a heat shrinkable band or an appropriately wide belt equipped with ties.

The heating can be obtained, for example, with an induction furnace. Generally, the bands are heated until the adhesive melts and the coating band softens.

Said coating band can be characterized, among other things, by a 3%–50% heat shrinkability. The adhesive can also have heat shrinkability characteristics.

By heat shrinking of the materials, it is intended that their surface area be reduced due to the effects of heat. Heat shrinkability is determined by placing in an oven for ten minutes at 120°–130° C. a piece of the material of known dimensions and by measuring again the dimensions after the heat treatment. The initial surface area being I and the surface area after heat treatment being I', the heat shrinkability percentage is derived from the following formula:

$$[(I-I')/I] \times 100$$

The following examples are given in order to illustrate, and not limit, the present invention.

EXAMPLE 1

The operation involves the coating of an exposed joint area of a steel pipe having a 12 inch diameter (30.48 cm) and a thickness of 8 mm, coated with a polypropylene based coating 2.5 mm thick.

The following materials are used:

epoxy primer made up of a liquid bicomponent resin without solvent, comprising an epoxy base and a polyamine catalyst which are mixed at a ratio of 100/45 by weight;

an adhesive composition band 0.1 mm thick with a propylene/ethylene random copolymer base (containing 4% by weight of ethylene), comprising 10% by weight of Dutral C0054 EPR copolymer containing 44% by weight of propylene, and 3% by weight of polypropylene modified with 4% maleic anhydride, and having the following properties:

melt flow rate (ASTM D 1238/condition L)=10 g/10 minutes
melting point (ASTM D 2117)=140° C.
specific weight (ASTM D 1515)=0.9 g/cm$^3$ 1 mm thick coating band based on a heterophasic composition obtained by stereospecific sequential copolymerization of propylene and ethylene, and containing 8% by weight of ethylene, having the following properties:

melt flow rate=0.8 g/10 minutes
melting point=160° C.
specific weight=0.9 g/cm$^3$
heat shrinkability=20%

The following equipment is used:
sander
inductor
metal blade and gas torch.

PROCEDURE

The exposed metal is sanded with an Sa 2 ½ finishing grade (according to SIS 055900). The surface of the pipe is heated to 80° C. with the inductor. The epoxy primer is applied with a brush, on the metal surface only, after the two components have been mixed thoroughly. Two layers of adhesive band and four of coating band are applied and then made to adhere by using a blade which has been heated with the gas torch. The metal of the pipe is heated to 230° C. with the inductor and then cooled slowly.

The results of the adhesion, impact resistance and cathodic disbonding tests conducted on the coating in the area repaired are reported in Table 1.

EXAMPLE 2

The procedure involves the coating of a damaged area of about 50 cm² in the polypropylene coating of the surface of a steel pipe having a 12 inch diameter (30.48 cm) and a thickness of 8 mm.

The following materials are used:
the epoxy primer of Example 1;
adhesive composition patches having the thickness and composition of the adhesive composition band of Example 1;
coating patches (A) having the same thickness and composition of the coating band of Example 1;
coating band (B) having the same thickness and composition of patches (A).

The heat shrinkability of the above mentioned coating material (B) is 20%.

The following equipment is used:
sander
brushing machine
inductor
metal blade and gas torch
optional hot air blower.

PROCEDURE

The exposed metal is sanded with Sa 2 ½ finishing grade (according to SIS 055900).

The entire edge of the coating surrounding the area to be repaired is chamfered with the brushing machine. The surface of the pipe is heated to 80° C. with the inductor. The epoxy primer is applied to the metal surface only with a brush after the two components have been mixed thoroughly.

Four patches of adhesive composition, with sizes equal to those of the area to be repaired, and three coating patches (A) are applied (the latter slightly overlapping the area to be repaired, by attaching them with a blade heated with the gas torch, or spot welding them by using a hot air blower and a thin string made of the same material as (A).

The thus prepared repair is then firmly wrapped with one layer of the coating band (B), which is attached with a blade heated with the gas torch. The metal of the pipe is heated to 230° C. with the inductor and then cooled slowly.

The results of the adhesion, impact resistance and cathodic disbonding tests conducted on the coating of the repaired area are reported in Table 1.

EXAMPLE 3

The procedure involves the coating of a damaged area of about 50 cm² in the polypropylene coating of the surface of a steel pipe having a 12 inch diameter (30.48 cm) and a thickness of 8 mm.

The following materials are used:
the epoxy primer of Example 1;
pelletized adhesive material having the following composition (percentage by weight):
72.35% of propylene/ethylene/1-butene random copolymer containing 2% of ethylene and 5% of 1-butene, and having a melt flow rate of 6 g/10 minutes, melting point of 135° C. and specific weight of 0.9 g/cm³;
204 of master DF 54 C (containing 50% of LDPE and 50% of Dutral C0054 copolymer);
5% of Escorene 450 P ethylene/vinyl acetate copolymer containing 45% of vinyl acetate produced by Esso;
2.5% of Hercoprime G polypropylene modified with 5% of maleic anhydride;
0.15% of Irganox 1076 stabilizer (composed of octadecyl3-(3',5'-di-tert-butyl-4'-hydroxyphenyl)propionate).

The following equipment is used:
sander
brushing machine
inductor
portable extruder
spatula.

PROCEDURE

The exposed metal is sanded with Sa 2 ½ finishing grade (according to SIS 055900). The entire edge of the coating surrounding the area to be repaired is chamfered with the brushing machine. The surface of the pipe is heated to 80° C. with the inductor. The epoxy primer is applied to the metal surface only with a brush after having mixed the two components thoroughly. The metal of the pipe is heated to 230° C. with the inductor.

The adhesive material described above is melted and poured from the extruder making sure to remove any underlying bubbles.

The thickness of the adhesive material is levelled with the spatula and then cooled slowly.

The results of the adhesion, impact resistance and cathodic disbonding tests conducted on the coating of the area repaired are reported in Table 1.

EXAMPLE 4

The procedure involves the same repair described in Example 3, using the same ingredients, equipment and procedure as Example 3, except that the adhesive material used is a pelletized material with the following composition (percentage by weight):
69.23% of the propylene/ethylene/4-butene random copolymer;
27.69% of Dutral CTX 053 EPR copolymer containing 454 of propylene;
2.984 of Hercoprime ® G polymer;
0.07% of Irganox ® 1010 stabilizer (composed of pentaerythritol-tetrakis-[3-(3',5'-di-tert-butyl-4'-hydroxyphenyl) propionate]);
0.03 synthetic hydrotalcite.

The results of the adhesion, impact resistance and cathodic disbonding tests conducted on the coating of the repaired area are reported in Table 1.

EXAMPLE 5

The procedure involves the same repair described in Example 1, using the same ingredients, equipment and procedure as Example 1, except that after the application of the coating band, the joint is wrapped with an air tube which is then inflated in order to keep the entire area under pressure and eliminate possible air bubbles.

The metal of the pipe is then heated with the inductor to 230° C. and then slowly cooled.

The results of the adhesion, impact resistance and cathodic disbonding tests coducted on the coating of the area repaired are reported in Table 1.

TABLE 1

TYPICAL VALUES OF THE PROPERTIES OF THE COATING IN THE REPAIRED AREA

| TEST | METHOD | CONDITION | UNIT | EXAMPLE 1 | EXAMPLE 2 | EXAMPLE 3 | EXAMPLE 4 | EXAMPLE 5 |
|---|---|---|---|---|---|---|---|---|
| Adhesion at 23° C. | DIN 30670 | 90° angle Velocity 10 mm/min band width 5 cm | N/mm | >25 | >25 | >25 | >25 | >25 |
| Adhesion at 100° C. | DIN 30670 | 90° angle Velocity 10 mm/min band width 5 cm | N/mm | >8 | >8 | >7 | >7 | >8 |
| Impact resistance at 23° C. | DIN 30670 | Punch diameter 25 mm rigid impact | Nm/mm | >15 | >10 | >9 | >9 | >15 |
| Cathodic disbonding at 23° C. | British gas PS-CW 6 | Duration 28 days tension −1.5 V 3% NaCl solution | Radius mm | <10 | <10 | <10 | <10 | <10 |

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

We claim:

1. A process for repairing exposed or damaged parts of a plastic coating on metal tubing by coating said parts with a coating material or affixing a patch or band thereto with an adhesive material, characterized in that the coating material or the adhesive material is an adhesive polymer composition comprising, by weight:
    A) from 59% to 94% of a polypropylene, a propylene/ethylene random copolymer, or a propylene/ethylene/1-butene random copolymer, or mixtures thereof with one or more plastomeric polymers selected from the group consisting of ethylene/vinyl acetate copolymers, low density polyethylene, high density polyethylene, polyamides and polyurethanes;
    B) from 5% to 40% of an elastomeric polymer or mixture of elastomeric polymers, selected from the group consisting of ethylene-propylene rubber, ethylene-propylene-diene monomer rubber, styrene-ethylene/butylene-styrene block copolymers, styrene-butadiene-styrene block copolymers and ethylene/ethyl acrylate copolymers;
    C) from 1% to 10% of polypropylene modified with 1% to 10% maleic anhydride, isophorone bismaleamic acid or acrylic acid; and
    D) from 0% to 3% of carbon black.

2. The process of claim 1, wherein component A) comprises polypropylene having an isotactic index up to 99%, a propylene/ethylene random copolymer having an ethylene content of from 1% to 6% by weight, a propylene/ethylene/1-butene random copolymer having an ethylene content of from 2% to 3% and a 1-butene content of from 4.5% to 5.6% by weight, or mixtures thereof with an ethylene/vinyl acetate copolymer having a vinyl acetate content of from 10% to 55%.

3. The process of claim 1, wherein the adhesive polymer composition is used as a coating material and is applied in the molten state on the exposed surface of the metal tubing, which has been optionally pretreated and preheated.

4. The process of claim 1, wherein the adhesive polymer composition is a sublayer of the patch or band, the patch or band further comprises a top layer of polyolefin material and the patch or band is applied to the optionally pre-treated and pre-heated exposed or damaged surface of said metal tubing.

5. The process of claim 1, wherein a layer of the adhesive polymer composition and at least one patch or band of polyolefin material are applied to the exposed or damaged surface of said metal tubing.

6. The process of claim 4 wherein said polyolefin material comprises one or more polymers selected from the group consisting of polypropylene having an isotactic index up to 99%, optionally mixed with 5 to 40% by weight ethylene-propylene rubber or ethylene-propylene-diene monomer rubber, and heterophasic compositions obtained by stereospecific sequential polymerization of propylene with ethylene or other olefins and containing up to 40% by weight of ethylene.

7. The process of claim 5 wherein said polyolefin material comprises one or more polymers selected from the group consisting of polypropylene having an isotactic index up to 99%, optionally mixed with 5 to 40% by weight ethylene-propylene rubber or ethylene-propylene-diene monomer rubber, and heterophasic compositions obtained by stereospecific sequential polymerization of propylene with ethylene or other olefins and containing up to 40% by weight of ethylene.

8. The process of claim 4 wherein said bands of polyolefin material has a heat shrinkability of 3%–50%.

9. The process of claim 5 wherein said polyolefin material has a heat shrinkability of 3%–50%.

* * * * *

UNITED STATES PATENT AND TRADEMARK OFFICE
CERTIFICATE OF CORRECTION

PATENT NO. : 5,256,226

DATED : October 26, 1993

INVENTOR(S) : Roberto Marzola et al

It is certified that error appears in the above-identified patent and that said Letters Patent is hereby corrected as shown below:

At col. 2, line 7, change "24" to --2--.

At col. 2, line 9, change "24" to --2--.

At col. 2, line 61, change "24" to --2--.

At col. 5, line 67, change "204" to --20%--.

At col. 6, line 46, change "454" to --45%--.

At col. 6, line 47, change "2.984" to --2.98%--.

At col. 8, line 53, delete "bands of".

Signed and Sealed this

Fifth Day of April, 1994

*Attest:*

BRUCE LEHMAN

*Attesting Officer*     *Commissioner of Patents and Trademarks*